3,703,494
RESOLE VARNISHES WHEREIN PHENOL IS ALKYLATED WITH A DICYCLOPENTADIENE-CONTAINING MIXTURE AND THEN CONDENSED WITH FORMALDEHYDE TO PRODUCE THE RESOLE
George J. Anderson, Wilbraham, and Ronald H. Dahms, Springfield, Mass., assignors to Monsanto Company, St. Louis, Mo.
No Drawing. Continuation-in-part of application Ser. No. 747,437, July 25, 1968. This application Mar. 1, 1971, Ser. No. 119,898
Int. Cl. C08g 5/06; C09d 3/54
U.S. Cl. 260—29.3   9 Claims

ABSTRACT OF THE DISCLOSURE

Varnishes of resole resins in largely non-aqueous organic solvents, especially lower alkanols, produced by first making a resole under basic aqueous conditions from formaldehyde and a phenol which has been previously reacted under Friedel Crafts conditions with a specific mixture of dicyclopentadiene, cyclopentadiene/acyclic conjugated diene codimers, and conjugated dienes and thereafter dissolving such resole in such organic solvent. These varnishes are useful in impregnating sheets and in making laminates therefrom.

RELATED APPLICATIONS

This application is a continuation-in-part of our earlier filed application, Ser. No. 747,437, filed July 25, 1968 now abandoned.

BACKGROUND

Phenolic varnishes using phenol-aldehyde resole type resins have long been used to impregnate cellulosic and other woven and non-woven materials, especially in fibrous sheet form, and to prepare laminates thereof. However, resole resin varnishes heretofore known when cured have generally suffered from a lack of properties for certain applications, for example, in electrical properties, water resistance properties, and mechanical strength properties. Because of these deficiencies, there has been a long felt need in the art of resole resin varnishes for varnishes containing modified phenol-aldehyde resole resins whch would overcome one or more of these deficiencies.

To make modified phenol-aldehyde resins for use in varnishes, the art has heretofore used as starting materials for reaction with aldehydes substituted phenols so as to produce phenol-aldehyde resins having a high molecular weight in proportion to the total amount of phenol used in such resin manufacture. The ratio of resole resin molecular weight (before curing) to starting phenol content can be termed, for convenience purposes, the PMW efficiency. In the past, increases in PMW efficiency have been attempted either by using naturally occurring substituted phenols, for example, cresol or cresylic acid, or by using synthetically substituted phenols. Examples of starting materials used for synthetically substituting phenols include naturally occurring drying oils (such as tung oil or oiticica oil), terpenes, and various unsaturated hydrocarbon materials (such as styrene).

Phenol-aldehyde varnishes made from resole resins containing phenols substituted with these starting materials, however, have a plurality of disadvantages. For one thing, the cost of starting materials is so significant that the cost of the resulting phenol aldehyde resin is increased to the point where it is not competitive with other polymeric materials used in varnishes or varnish-like products. In addition, the resulting phenol aldehyde resin product when cured either has an undesirably wide or undesirably narrow distribution of physical and chemical properties. Furthermore, even though the PMW efficiency of resole resins suitable for use in varnishes is improved by using such prior art substituted phenols, the resole resin varnishes derived therefrom tend to be inferior as respects such properties as storage stability, viscosity, cure rate (after varnish solvent is removed), necessity for close manufacturing tolerances, or the like.

When one reacts an aldehyde with a phenol which has been synthetically substituted with a certain well-defined mixture of dicyclopentadienes, cyclopentadiene/acyclic conjugated diene codimers, and conjugated dienes, there is produced a phenol-aldehyde resole resin product which has a high PMW efficiency. When in turn such resole resin product is used in a varnish, the resulting novel varnish surprisingly has the capacity, when used in the manufacture of laminates, to produce when thermoset, an excellent combination of electrical, mechanical, and water resistance properties.

Such varnishes furthermore have surprisingly good storage stability and low viscosity characteristics which are properties desirable in phenolic varnishes intended for use in laminate manufacture. These varnishes display an excellent balance of penetration qualities when used to impregnate non-woven sheet-like materials. When these varnishes are used for impregnating a preformed integral sheet of fibrous cellulosic material, and then such product is thermoset, it is found that the thermoset product resin as so impregnated has a surprisingly low glass transition temperature, thereby making the impregnated thermoset sheet product less brittle than many prior art analogous products made, for example, with different resole resins employing a pure alkylated phenol (e.g. a phenol substituted with dicyclopentadiene) and formaldehyde. These end products have generally improved properties heretofore unknown. For example, such a product laminate gives surprisingly and unexpectedly a combination of better electrical, mechanical, water absorption properties than known prior art laminates.

SUMMARY

This invention is directed to varnishes of certain substituted phenol-formaldehyde resole resins in organic solvents. These varnishes are especially suited for use in the manufacture of impregnated sheet materials and of laminates thereof. The laminated products have high flexural strength, low water absorption and excellent electrical properties.

The varnishes of this invention comprise:

(A) from about 20 to 75 weight percent of a substituted phenol-formaldehyde resole resin,
(B) from about 0.5 to 15 weight percent of dissolved water, and (C) the balance up to 100 weight percent of any given varnish being an organic liquid which:
  (1) is substantially inert (as respects such resin mixture),
  (2) boils (evaporates) below about 250° C. at atmospheric pressures (below 150° C. preferred), and
  (3) is a mutual solvent for such resole resin and such water (if present), the amount of said organic liquid being present in any given varnish being such as to maintain both said resole resin and said water in dissolved form.

The substituted phenol-formaldehyde resole resin employed in the products of this invention has a formaldehyde to phenol ratio of from about 0.8 to 2.0 (preferably from about 0.9 to 1.5), and is produced by reacting in the presence of an organic basic catalyst under liquid aqueous phase conditions a substituted phenol mixture with formaldehyde. The resole resin used in this invention further has a relatively high molecular weight as shown by the fact that it is substantially water insoluble but it also has a methanol solubility such that a 60 weight percent solution thereof can be prepared in methanol. Such methanol solution characteristically has a viscosity not greater than about 5000 centipoises, and preferably the viscosity lies in the range from about 50 to 500 centipoises. In addition, this resin has a free formaldehyde content which is less than about 5 weight percent (based on total dry resin weight).

The substituted phenol mixture used to make such resin is itself prepared by initially reacting phenol under Friedel-Crafts conditions with a mixture of dicyclopentadiene, cyclopentadiene/acyclic conjugated diene codimers and conjugated dienes (herein termed a diene codimer compound mixture) which comprises (when in a form substantially free of other materials wherein the sum of all component compounds of any given such mixture equals substantially 100 weight percent):

(A) from about 70 to 90 weight percent of dicyclopentadiene,
(B) from about 10 to 30 weight percent of compounds each molecule of which is a codimer of cyclopentadiene with at least one acyclic conjugated alkadiene having from 4 through 6 carbon atoms per molecule, and
(C) from about 2 to 15 weight percent of compounds each molecule of which is a cyclic and/or an acyclic conjugated alkadiene having 5 or 6 carbon atoms per molecule.

Examples of suitable such acyclic conjugated alkadienes (whether or not dimerized as specified above) include butadiene (a four carbon molecule used as specified above) piperylene, isoprene, 1,3-hexadiene, 1-methyl-1,3-pentadiene, and the like. Examples of suitable such cyclic conjugated alkadienes include cyclopentadiene, methylcyclopentadienes, and the like.

Preferably, those above identified compounds of (C) comprise from about 4 to 8 weight percent of such a mixture (same basis).

At the time when such a diene codimer mixture is reacted with phenol as indicated, there can be present as diluents inert (e.g. as respects reactivity towards components of such diene codimer mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g. of starting materials, of product, or the like, as the case may be) which is substantially free (e.g. on an analytical or theoretical basis) of substances (like inerts as respects reactivity with phenol under Friedel-Crafts catalysis) other than such mixture itself. For example, the aforeindicated starting mixture of diene codimers could have an inert hydrocarbon diluent admixed therewith, such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

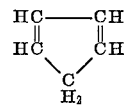

The term "dicyclopentadiene" as used herein refers to the cyclic compound having the structure:

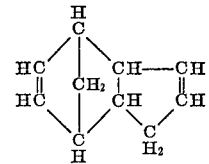

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. Optionally such a mixture of diene codimer compounds can contain up to about 2 weight percent (based on same total mixture basis) of acyclic and cyclic alkenes containing 5 and 6 carbon atoms per molecule (such as pentene, cyclopentene, hexene, cyclohexene, methylpentene, methylcyclopentene, etc.). Also optionally, such a mixture can contain up to about 2 weight percent (based on same total mixture basis) of a codimer of cyclopentadiene with a methylcyclopentadiene (such as monomethylcyclopentadiene). For example, one suitable such mixture is available commercially under the trade designation "Dicyclopentadiene Concentrate" from the Monsanto Company, St. Louis, Mo., which comprises:

TABLE I

| Component [1] | Total estimated weight percent [2] | Adjusted relative approximate weight [3] |
|---|---|---|
| A. Dicyclopentadiene compounds: | | |
| 1. Dicyclopentadiene | 72.1 | 77.1 |
| 2. Codimers of cyclopentadiene and methylcyclopentadiene | 0.4 | 0.4 |
| B. Cyclopentadiene/alkadiene codimers; (codimers of cyclopentadiene and acyclic conjugated alkadienes containing from 4 through 6 carbon atoms per molecule [4] | 18.6 | 19.8 |
| C. Conjugated alkadienes; (cyclic and acyclic conjugated alkadienes containing 5 and 6 carbon atoms per molecule [5] | 2.2 | 2.3 |
| D. Alkenes; 1. Cyclopentene | 0.4 | 0.4 |
| Total of (A), (B), (C), and (D) | 93.7 | 100.0 |
| E. Inert hydrocarbon diluents (total) | 6.3 | |
| 1. Benzene | 0.9 | |
| 2. Methylpentane, methylcyclopentane, and hexane | 5.4 | |

[1] Data in Table I derived from vapor-liquid-phase chromatography and mass spectrometry.
[2] Based on total weight of diene dimer compounds and other components including diluents.
[3] Diene codimer compound mixture when in a form substantially free of other materials wherein the sum of all component compounds in any given such mixture equals substantially 100 weight percent.
[4] These alkadienes are usually piperylene and isoprene; composition of such alkadienes is somewhat variable.
[5] These alkadienes are usually piperylene, isoprene and cyclopentadiene composition of such alkadienes is somewhat variable.

To react phenol with such an aforedescribed diene codimer compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. In the practice of this invention, the phenol and suitable Friedel-Crafts acid catalyst are mixed, brought to the proper temperature and the diene codimer compound mixture metered into the acidified (or catalyzed) phenol.

For the purposes of this invention, the reaction of diene codimer compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) other inorganic halides, such as gallium, titanium, antimony and zinc halides (including $ZnCl_2$);
(B) inorganic acids, such as sulphuric, phosphoric and the hydrogen halides (including HF);
(C) activated clays, silica gel alumina, and the like;
(D) $BF_3$ and $BF_3$ organic complexes including complexes of $BF_3$ with organic compounds, such as ethanol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and
(E) alkyl, aryl and aralkyl sulfonic acids, such as ethanesulfonic acid benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, β-naphthalene sulfonic acid, 1-naphthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 by weight parts of such diene codimer compound mixture (on a 100 weight percent basis in a form substantially free of other materials) in the presence of less than about 10 weight percent (based on the phenol) of acid catalyst. Typically, from about 0.1 to 1 weight percent (same basis) of acid (Friedel-Crafts) catalyst is employed (based on phenol).

The reaction mass is then heated to a temperature in the range of from about 25 to 200° C. The rate of this reaction is dependent, to some degree, on the temperature employed. In general, the reaction is rapid, and a complete reaction between phenol and diene codimer compound mixture is preferred. Generally, a total heating time of from about 10 minutes to 4 hours is employed. Suitable process variables are summarized in Table II below.

TABLE II

| Process variable | Broad range | Preferred range |
| --- | --- | --- |
| Temperature (° C.) | About 25-200° C. | About 70-125° C. |
| Reaction time | Less than about 4 hours. | About 10-30 minutes. |
| Catalyst (based on phenol) | Less than about 10 weight percent. | About 0.1-1.0 weight percent. |
| Inert hydrocarbon content (based on total weight diene codimer compound mixture and diluent). | Up to about 50 weight percent. | About 2-10 weight percent. |
| Total diene codimer-compound mixture [1] (based on 100 parts by weight phenol). | About 10-100 parts by weight. | About 20-70 parts by weight. |

[1] On a 100 weight percent basis in a form substantially free of other materials.

In general, to produce a resole phenol-formaldehyde resin for use in this invention from a substituted phenol product prepared as just described, such product is neutralized under aqueous liquid phase conditions as by the addition of base (ammonium hydroxide and/or an amine) and then from about 0.8 to 2.0 moles of formaldehyde per one mole of (starting) phenol is mixed with the substituted phenol product (now itself a starting material). Water may be added with the formaldehyde. Formalin is preferred as a source for formaldehyde. A basic catalyst material selected from the group consisting of ammonium hydroxide and amines is then introduced into the reaction mixture. The amines used herein are selected from the group consisting of primary amines (such as ethylamine, isobutylamine, ethanol amine, cyclohexylamine, and the like); secondary amines (such as diethanol amine, piperidine, morpholine, and the like); and tertiary amines (such as hexamethylene tetramine, triethylamine, triethanolamine, diethyl cyclohexyl amine, triisobutyl amine, and the like). Preferred amine catalysts have molecular weights below about 300 and more preferably below about 200. The amine catalyst may include hydroxyl groups which tend to promote solubility of the amine in the reaction mixture. The pH of this reaction mixture using such basic catalyst is maintained above about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products, a basic non-metallic catalyst is used when reacting such substituted phenols with formaldehyde. Suitable process variables for making such resole are summarized in Table III below.

TABLE III

| Process variable | Broad range | Preferred range |
| --- | --- | --- |
| Formaldehyde/phenol mol ratio. | About 0.8-2.0 | About 1.0-1.5. |
| Catalyst [1] | About 0.1-10 | About 0.3-4. |
| pH | About 7.0 | About 7.5-8.5. |
| Temperature | About 60° C. to reflux. | About 80° C. to reflux. |
| Reaction time | Under about 4 hours | About 20-120 minutes. |

[1] Parts by weight based on 100 parts by weight total phenol after neutralization of starting phenol.

The resole product produced by reacting the substituted phenol with aldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables but which usually ranges from a syrupy liquid to a semi-solid state. A resole product derived from such aqueous phase as a brown colored material whose viscosity varies from a syrup to a solid. Such emulsion is preferably dehydrated in making a varnish of this invention.

When such emulsion is dehydrated under heat and reduced pressure to a water content generally under about 15 weight percent but over about 2 weight percent, there is produced a single-phased, clear, resole resin in the physical form usually of a high solids viscous dark fluid. In any given instance, its total solids content, (residual) water content, and viscosity of this product depend upon the amount of substituted phenol aldehyde product present, the mole ratio of aldehyde to substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperatures ranging from about 40 to 90° C. Higher and lower temperatures and pressures can be employed, as those skilled in the art appreciate.

To prepare a varinsh from a resole resin product as described above, such resole is then conveniently dissolved in a relatively volatile, inert organic solvent medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resin in such solvent medium is below about 15 weight percent (based on total weight). This product solution is a varnish of the invention.

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonane, octane, petroleum fractions, etc. Preferably, the total water content of a varnish of the invention is below about 10 weight percent, and more preferably falls in the range of from about 0.5 to 5 weight percent. Relatively high boiling solvents like cresols can be used.

Those skilled in the art will appreciate that care should preferably be taken when using this procedure to use an organic liquid system in which the phenolic resole resins are completely soluble as well as any water present. Adding, for example, a ketone or an ether solvent like butyl cellosolve generally improves the water tolerance (ability to dissolve water) of a solvent system.

These varnishes are characteristically dark colored, one-phase, clear liquid solutions having a viscosity ranging from about 5 to 5000 centipoises, the exact viscosity of a given varnish depending upon chemical process and product variable used in manufacture. For impregnating applications, viscosities of from about 50 to 500 centipoises are preferred.

The total solids content of a given varnish product can be as high as about 85 weight percent or even higher and as low as about 5 weight percent or even lower, but preferred solids contents usually fall in the range of from about 25 to 65 weight percent.

When used for impregnation and reinforcing purposes, the liquid resole resin varnishes of this invention find use in impregnating cellulosic paper, asbestos paper, and other non-woven sheet structures as well as woven fabrics (cotton, glass fibers, polyester nylon, etc.). Impregnation can be accomplished by any convenient means including dipping, coating, spraying, mixing, or the like.

After impregnation, the substrate material is dried to lower the volatiles content and then heated to advance the resin to the proper degree for the intended use. The resole varnishes of this invention are useful in the preparation of laminates such as those made from impregnated materials. Such laminates are used in electrical applications as supports or as insulation for conductive elements. The laminates are generally provided in sheet or block from which are then punched or otherwise machined to provide the desired configurations.

In general a preferred individual substrate member is cellulosic and is in a preformed sheet-like condition. It need have no special characteristics. It can be composed of cellulosic fibers which optionally can contain up to about 50 weight percent of a synthetic organic polymeric fibrous material, such as a polyester, a polyimide, a vinylidene chloride polymer, a protein (natural) and acrylonitrile/vinyl chloride copolymer, mixtures thereof, and the like. Typical thicknesses range from about 3 to 30 mils (under about 10 preferred). The cellulosic substrate, whether or not modified with such a polymeric fibrous material, is preferably in an integral, uniform, woven or non-woven, sheet-like condition. Preferably, individual substrate members are composed substantially of cellulose. The cellulosic fibers used in such a substrate member can be of natural or synthetic origin. Typical well known sources for cellulose fibers include wood, cotton, and the like. Typically, and preferably, average fibers used in substrates employed in this invention have length to width ratios of at least about 2:1, and more preferably about 6:1, with maximum length to width ratios being variable.

The term "substantially" as used herein in reference to cellulosic substrates has reference to the fact that such a substrate comprises mainly cellulose fibers with not more than about 5 to 10 percent of any given cellulosic substrate being other non-fibrous components, such as non-fibrous fillers, diluents, and the like, or fibrous non-cellulosic materials, such as those derived from organic sources (e.g. protein, synthetic polymers like polyesters, etc.), or inorganic sources (e.g. silicious fibers or metallic fibers.) Such other components when and if present characteristically have size ranges which are not greater in magnitude than the cellulosic fibers. Preferably, such other components are under one weight percent of the total weight of a starting individual cellulosic substrate member.

Particularly when high electrical properties are desired in a product laminate the cellulosic substrate member should have a low ash content. Ash contents under one weight percent (based on total cellulosic substrate member weight) are preferred, and those having ash contents under about 0.5 weight percent are more preferred.

When the impregnated cellulosic sheet-like products are to be used, for example, as battery separators, one class of preferred cellulosic non-woven fibrous permeable structures have a Gurley porosity of about 1–25 seconds when using a 5 oz. cylinder and a ¼ sq. in. orifice.

Before a varnish of this invention is used for impregnation of such a preformed cellulosic substrate, it can be diluted with an organic liquid (as described above) so that the total solids concentration of such resulting varnish composition typically ranges from about 5 to 85 weight percent (as indicated), with solids contents of about 15 to 65 percent being preferred. The varnishes of this invention enable one to impregnate a preformed cellulosic substrate such as paper without causing serious deterioration in the wet strength thereof so that the wet strength of a preformed cellulosic substrate material after impregnation and before drying to remove volatile liquid is maintained at convenient processing levels for subsequent drying, advancing, etc. by machines, etc.

In general, impregnation of a preformed substrate cellulosic member by such a varnish composition can be accomplished by any conventional means, including spraying, dipping, coating, or the like, after which it is convenient and preferred to dry the so-treated sheet to remove residual volatile components and thereby leave a desired impregnated sheet-like construction. In drying, care is used to prevent leaving excessive volatile material in the impregnated sheet. In general, a volatile level of less than about 8 percent by weight is preferred.

Volatile level of an impregnated sheet member is conveniently determined by loss in weight after 10 minutes at 160° C. of a sample impregnated sheet. A so impregnated sheet member generally contains from about 5 to 70 weight percent of solids derived from the substituted phenol-formaldehyde resole.

A preferred sheet-like product is one which is to be subsequently used in the manufacture of cellulosic laminates and is advanced after impregnation and drying to an extent such that it has a flow of from about 3 to 20 percent (preferably from about 5 to 15 percent). To so advance a sheet member to such a flow it is convenient to heat in air such an intermediate sheet to temperatures in the range of from about 30 to 180° C. for a time sufficient to advance same to the so desired extent. It will be appreciated that such an advancement can be conveniently accomplished while residual volatile materials are being removed in a drying operation after impregnation, as indicated above.

Intermediate sheet-like members (before being cured or thermoset), to the extent indicated or not, are generally at least about 4 mils thick and can be as thick as 20 mils, though thicknesses not more than about 10 mils are preferred.

The density of an individual impregnated sheet-like product is relatively unimportant since a laminate/product, as described below, is formed under heat and pressure conditions which generally solidify all components together into an integral, solid, nonporous, thermoset mass.

To make a laminate construction from an impregnated sheet member as described generally above, one forms at least one such sheet member (preferably advanced as described above) into a layered configuration which is at least two layers thick with adjoining layers being substantially in face-to-face engagement. As those skilled in the art will appreciate, an individual laminate construction can comprise a series of different impregnated intermediate cellulosic substrate members at least one of which is an intermediate sheet-like member prepared as described herein or it can comprise a series of such intermediate members prepared as described herein, depending upon properties desired in the product laminate. It is preferred to use intermediate sheet members as the sole components for laminates of this invention.

Such a layered configuration is then subjected to pressure in the range of from about 50 to 2000 p.s.i. while maintaining temperatures in the range of from about 120 to 180° C. for a time sufficient to substantially completely thermoset the composite and thereby produce a desired laminate. Preferably, the laminate is pressed at about 140 to 160° C. at about 500 to 1500 p.s.i. for 15 to 60 minutes.

To make a battery separator, one can initially treat a preformed fibrous non-woven cellulosic sheet with a liquid resole resin varnish composition as described above by either a wet-web saturation method or a dry-web method. The product impregnated cellulosic sheet is dried to remove excess solvent. This product sheet is then subjected to a temperature of about 200° F. to about 600° F. in order to cure the resin to an infusible, substantially completely thermoset state. The time of exposure of the treated cellulosic fibrous sheet to these temperatures will vary from approximately 30 minutes at 200° F. to at least one minute at 600° F. In addition, the cellulosic fibrous battery separator is generally ribbed or folded before being thermoset to increase its resistance to degradation during use thereof in a lead-acid battery. Generally, in making a battery separator it is also desirable to impregnate the cellulosic fibrous sheet with from about 20 to 50 weight percent of the resin composition of this invention.

Alternatively, the cellulosic fibrous sheet may be first treated with the varnish of this invention alone, and secondly, in a separate operation, treated with a surface active agent either before or after subjecting the phenol-aldehyde treated fibrous sheet to the elevated temperatures.

The resole varnishes of this invention can be used in the manufacture of automotive oil filters. The cellulosic substrate employed in such filters is typically a cellulose fiber non-woven paper modified with from about 1 to 50 weight percent of a synthetic organic fiber (such as a polyester or the like) and having a sheet thickness of from about 5 to 20 mils. Such a sheet is impregnated with sufficient resole varnish resin (as described above) according to this invention to obtain an impregnated sheet member having a resin content of about 15 to 25 percent, based on the weight of the total weight of the impregnated substrate. After the substrate is impregnated, it is heated to advance the resin to a B-stage (advance the resin but not gel it) and then is conventionally corrugated or pleated (as those skilled in the art appreciate) to form the filter element. The filter element is then typically assembled into a filter container and heated to 250° to 350° F. for from 5 to 20 minutes to cure the resin. The filter has good flexibility and good resistance to embrittlement after immersion in hot motor oil. Further, the B-staged impregnated paper has good tensile strength yet is flexible enough for processing into filter elements.

In general, to thermoset (cure) a cellulosic substrate impregnated with a substituted phenol-formaldehyde resin derived from a varnish of this invention one may conveniently heat a so-impregnated structure to a temperature ranging from about 200 to 350° F. for a time of from about 1 to 45 minutes, though lower and higher times and temperatures can be used.

In this invention, all solids in impregnated non-thermoset bodies are conveniently measured using the ASTM Test Procedure D115-55.

Embodiments

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of substituted phenols made with the diene codimer mixture of the invention are given below.

EXAMPLE A

To a stirred reaction vessel 100 parts of phenol and 0.5 part concentrated sulfuric acid are charged and the resulting mixture is heated to 125° C. Then 25 parts of a diene codimer compound mixture available commercially under the trade designation "Dicyclopentadiene Concentrate" from Monsanto Company and having a composition as described above in Table I are added to this phenol mixture over a thirty minute period, keeping the temperature between 125 and 135° C. After the addition, the mixture temperature is held at 125 to 135° C. for fifteen minutes. The product is a substituted phenol mixture.

EXAMPLES B to I

Using the procedure and raw materials described in Example A, additional substituted phenol mixtures are prepared, as shown in Table IV below:

TABLE IV

| Ex. No. | Friedel-Crafts catalyst, parts per 100 phenol | Diene codimer mixture, parts per 100 phenol | Reaction, temperature, °C. | Post reaction holding period, minutes |
|---|---|---|---|---|
| B | $H_2SO_4$, 0.5 | 20 | 125 | 15 |
| C | do | 45 | 125 | 30 |
| D | do | 55 | 125 | 30 |
| E | $H_2SO_4$, 1.0 | 65 | 150 | 30 |
| F | $BF_3$ etherate, 0.5 | 35 | 70 | 60 |
| G | do | 55 | 90 | 30 |
| H | $AlCl_3$, 1.0 | 35 | 125 | 30 |
| I | $BF_3$ etherate, 0.5 | 70 | 150 | 60 |

Examples of phenolic resole resin varnishes of this invention are illustrated below. The substituted phenol-formaldehyde resole resin produced as described and employed in each varnish product has a formaldehyde to phenol ratio of from about 0.9 to 1.5. Each is produced by reacting in the presence of an organic basic catalyst under liquid aqueous phase conditions a substituted phenol mixture with formaldehyde. Each is substantially water insoluble, but has a methanol solubility such that a 60 weight percent solution thereof can be prepared in methanol. Each such methanol solution characteristically has a viscosity in the range from about 50 to 500 centipoises. Each resin has a free formaldehyde content which is less than about 5 weight percent. Each of the product varnishes is suitable for use in impregnating cellulosic substrates to produce products having good mechanical and electrical properties.

EXAMPLE 1

To the substituted phenol mixture made in Example A is added (per 100 parts of phenol 2 parts triethylamine, 2 parts hexamethylenetetramine and 83 parts of 50% formalin. This mixture is heated to a 100° C. reflux for 55 minutes, then cooled to 50° C. to produce a resole resin which is then dehydrated to 60° C. and 26 inches Hg. When this temperature is reached, 80 parts methanol are added and the solution cooled. The product varnish is clear and thermally cures to give a clear film on a heated steel surface. The varnish has 60.3% solids and an Ostwald viscosity of 98 centipoises.

EXAMPLE 2

To the substituted phenol mixture made in Example D is added (per 100 parts of phenol) 2 parts of triethylamine, 3 parts of hexamethylenetetramine and 60 parts of 50% formalin. The mixture is heated to a 100° C. reflux for 50 minutes, then cooled to 50° C. to produce a resole resin which is then dehydrated to 60° C. and 27 inches Hg. When this temperature is reached 70 parts methanol and 10 parts methyl ethyl ketone are added. A clear varnish is obtained which thermally cures to give a clear film on a heated steel surface.

EXAMPLES 3 to 9

Examples of other varnishes of this invention are summarized in Table V. Preparation procedure for each is as given in Example 1. In each instance, a clear varnish is obtained which thermally cures to give a clear film.

TABLE V

| Example Number | Substituted phenol Example Number | Resole preparation method Example Number |
|---|---|---|
| 3 | B | 1 |
| 4 | C | 2 |
| 5 | E | 2 |
| 6 | F | 1 |
| 7 | G | 2 |
| 8 | H | 1 |
| 9 | I | 2 |

EXAMPLE 10

To a stirred reaction vessel 100 parts of phenol and 0.5 part concentrated sulfuric acid are charged and the resulting mixture is heated to about 125° C. Then 30 parts of a diene codimer mixture are added to the phenol mixture over a thirty minute period, keeping the temperature between 125 and 135° C. This diene codimer compound mixture comprises, when in a form substantially free of other materials wherein the sum of all component compounds of any given such mixture equals substantially 100 weight percent, about 70 weight percent dicyclopentadiene, about 28 weight percent of codimers of cyclopentadiene with butadiene and isoprene (50/50) and about 2 weight percent of 50/50 1-pentene and 1-hexene mix. This diene codimer mixture additionally contains about 10 weight percent toluene as an inert diluent. After the addition, the product mixture is held at 125 to 135° C. for about fifteen minutes.

To this substituted phenol product mixture is then added (per 100 parts of phenol) 2 parts triethylamine, 2 parts by weight hexamethylenetetramine and 83 parts by weight of 50% formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

EXAMPLE 11

The procedure of Example 10 is repeated except that here the diene codimer compound mixture comprises, when in a form substantially free of other materials wherein the sum of all component compounds of any given such mixture equals substantially 100 weight percent, about 90 weight percent dicyclopentadiene, about 8 weight percent of codimers of cyclopentadiene with butadiene and isoprene (50/50), and about 2 weight percent of 50/50 1-pentene and 1-hexene mix.

This diene codimer mixture additionally contains about 10 weight percent toluene percent toluene as an inert diluent. The varnish product so produced is clear and thermally cures to give a clear film on a heated steel surface.

EXAMPLE 12

The procedure of Example 10 is repeated except that here the diene codimer mixture comprises, when in a form substantially free of other materials wherein the sum of all component compounds of any given such mixture equals substantially 100 weight percent, about 80 weight percent dicyclopentadiene, about 5 weight percent of codimers of cyclopentadiene with butadiene and isoprene (50/50), and about 15 weight percent of 50/50 1-pentene and 1-hexene mix. This diene codimer mixture additionally contains about 10 weight percent toluene as an inert diluent. The varnish product so produced is clear and thermally cures to give a clear film on a heated steel surface.

EXAMPLE 13

An example of cellulose impregnation and a laminate made with resole varnish of this invention follows.

Cotton linters paper (10 mils thick) is immersed in the undiluted varnish of Example 2, then passed through squeeze rolls to remove excess resin and hung in an oven to drive off volatile material and advance the resin.

Eight plies of the impregnated sheet is placed in a press and subjected to 1000 p.s.i. pressure for thirty minutes at 160° C. Upon cooling, a laminate is obtained having a combination of good mechanical and electrical properties.

EXAMPLE 14

The procedure of Example 1 is repeated except that to the substituted phenol mixture made in Example A is added (per 100 parts of phenol), 2 parts diethanolamine, 3 parts ethanol amine, and 83 parts of 50 percent formalin. The product varnish is clear and thermally cures to give a cure film on a heated steel surface. The varnish has about 60 percent solids and an Ostwald viscosity of about 98 centipoises.

What is claimed is:

1. A varnish adapted for use in the manufacture of reinforced plastics comprising:
   (A) from 20 to 75 weight percent of a dissolved phenolformaldehyde resole resin;
   (B) from 0.5 to 15 weight percent of dissolved water; and
   (C) the balance up to 100 weight percent of any given solution being an organic liquid which:
      (1) is substantially inert,
      (2) boils below about 250° C. at atmospheric pressure, and
      (3) is a mutual solvent for the resole resin and for the water, the amount of organic liquid present in any given varnish being such as to maintain the resole resin and the water in a single phase;
   (D) said resole resin having been prepared by reacting formaldehyde and a substituted phenol mixture in the mole ratio of 0.8:1 to 2.0:1 in the presence of a basic catalyst selected from the group consisting of ammonium hydroxide and primary, secondary and tertiary amines having molecular weights under about 300 and thereafter dehydrating the resulting emulsion to a water content of from about 0.5 to 15 weight percent;
   (E) said substituted phenol mixture having been prepared by reacting phenol under substantially anhydrous conditions in the presence of an acid catalyst at a temperature in the range of from 25 to 200° C. with from 10 to 100 parts by weight of a mixture of diene codimer compounds for each 100 parts by weight of phenol;
   (F) said mixture of diene codimer compounds comprising (when in a form substantially free of other materials):
      (1) from 70 to 90 weight percent of dicyclopentadiene,
      (2) from 10 to 30 weight percent of compounds each molecule of which is a codimer of cyclopentadiene with at least one acyclic conjugated alkadiene having from 4 through 6 carbon atoms per molecule, and
      (3) from 2 to 15 weight percent of compounds each molecule of which is a cyclic or an acyclic conjugated alkadiene having 5 or 6 carbon atoms per molecule.

2. The product of claim 1 wherein the resole resin is substantially insoluble in water and has a viscosity in methanol solution at 60 weight percent solids concentration of not greater than 5,000 centipoises.

3. The product of claim 1 wherein the mixture of diene codimer compounds comprises from 4 to 8 weight percent of compounds each molecule of which is a cyclic or an acyclic conjugated alkadiene having 5 or 6 carbon atoms per molecule.

4. The product of claim 1 wherein the substituted phenol mixture is the product of reaction of from 20 to 70 parts by weight of a mixture of diene codimer compounds for each 100 parts by weight of phenol.

5. The product of claim 1 made by reacting said phenol and said mixture of diene codimers in the presence of an inert hydrocarbon such that, of the combined weight of said mixture of carbocyclic compound and said inert hydrocarbon, the inert hydrocarbon portion thereof ranges from about 5 to 50 weight percent thereof.

6. A varnish adapted for use in the manufacture of reinforced plastics comprising:
   (A) from 20 to 75 weight percent of a dissolved phenol-formaldehyde resole resin;
   (B) from 0.5 to 15 weight percent of dissolved water; and
   (C) the balance up to 100 weight percent of any given solution being an organic liquid which:
      (1) is substantially inert,
      (2) boils below about 250° C. at atmospheric pressure, and
      (3) is a mutual solvent for the resole resin and for the water, the amount of organic liquid present in any given varnish being such as to maintain the resole resin and the water in a single phase;
   (D) said resole resin having been prepared by reacting formaldehyde and a substituted phenol mixture in the mole ratio of 0.8:1 to 2.0:1 in the presence of a basic catalyst selected from the group consisting of ammonium hydroxide and primary, secondary and tertiary amines having molecular weights under about 300 and thereafter dehydrating the resulting emulsion to a water content of from about 0.5 to 15 weight percent;
   (E) said substituted phenol mixture having been prepared reacting phenol under substantially anhydrous conditions in the presence of an acid catalyst at a temperature in the range of from about 25 to 200° C. with from 20 to 70 parts by weight of a mixture of diene codimer compounds for each 100 parts by weight of said phenol;
   (F) said mixture of diene codimer compounds comprising (when in a form substantially free of other materials):
      (1) from 70 to 90 weight percent of dicyclopentadiene,
      (2) from 10 to 30 weight percent of compounds each molecule of which is a codimer of cyclopentadiene with at least one acyclic conjugated alkadiene having from 4 through 6 carbon atoms per molecule, and
      (3) from 4 to 8 weight percent of compounds each molecule of which is a cyclic or an acyclic conjugated alkadiene having 5 or 6 carbon atoms per molecule;

wherein the resole resin is substantially insoluble in water and has a viscosity in methanol solution at 60 weight percent solids concentration of not greater than 5,000 centipoises.

7. In a process for making a resole varnish involving the step of dissolving a resole resin which is at least partially dehydrated in an organic liquid, the improvement which comprises the three steps:
   (1) contacting 100 parts by weight of phenol with from 10 to 100 parts by weight of a mixture of diene codimers in the presence of an acid catalyst at a temperature in the range of 25 to 200° C., said mixture of diene codimers comprising (when in a form substantially free of other materials):
      (A) from 70 to 90 weight percent of dicyclopentadiene,
      (B) from 10 to 30 weight percent of compounds each molecule of which is a codimer of cyclopentadiene with at least one acyclic conjugated alkadiene having from 4 through 6 carbon atoms per molecule, and
      (C) from 2 to 15 weight percent of compounds each molecule of which is a cyclic or an acyclic conjugated alkadiene having 5 or 6 carbon atoms per molecule;

(2) Heating the substituted phenol mixture so produced with from 0.8 to 2.0 mols of formaldehyde per mol of phenol under aqueous liquid phase conditions in the presence of a basic catalyst selected from the group consisting of ammonium hydroxide and primary, secondary and tertiary amines having molecular weights under about 300 for a time sufficient to form a resole resin; and (3) dehydrating the resole resin product so produced to a water content of from about 0.5 to 15 weight percent before dissolution in such an organic liquid.

8. The process of claim 7 wherein mixture of diene codimer compounds comprises from 4 to 8 weight percent of compounds each molecule of which is a cyclic or an acyclic conjugated alkadiene having 5 to 6 carbon atoms per molecule.

9. The process of claim 7 wherein the substituted phenol mixture is the product of reaction of from 20 to 70 parts by weight of a mixture of diene codimer compounds for each 100 parts by weight of phenol.

References Cited

UNITED STATES PATENTS

| | | | |
|---|---|---|---|
| 2,656,335 | 10/1953 | Bloch | 260—50 |
| 2,831,821 | 4/1958 | Christenson et al. | 260—17.2 |
| 3,069,373 | 12/1962 | Greenlee | 260—28 |
| 3,420,915 | 1/1969 | Braithwaite | 260—837 |

HOWARD E. SCHAIN, Primary Examiner

U.S. Cl. X.R.

117—132 BF, 161 L; 161—198, 205, 215, 259, 262; 260—7, 32.8 R, 33.4 R, 33.6 R, 53 R